(12) United States Patent
Valtersson (10) Patent No.: US 12,055,642 B2
(45) Date of Patent: Aug. 6, 2024

(54) ELECTRONIC ARRANGEMENT FOR DETERMINING A MOVEMENT

(71) Applicant: Volvo Truck Corporation, Gothenburg (SE)

(72) Inventor: Edvin Valtersson, Sävedalen (SE)

(73) Assignee: Volvo Truck Corporation, Gothenburg (SE)

(*) Notice: Subject to any disclaimer, the term of this patent is extended or adjusted under 35 U.S.C. 154(b) by 0 days.

(21) Appl. No.: 17/766,547

(22) PCT Filed: Oct. 14, 2020

(86) PCT No.: PCT/EP2020/078945
§ 371 (c)(1),
(2) Date: Apr. 5, 2022

(87) PCT Pub. No.: WO2021/074244
PCT Pub. Date: Apr. 22, 2021

(65) Prior Publication Data
US 2024/0053490 A1  Feb. 15, 2024

(30) Foreign Application Priority Data

Oct. 18, 2019 (WO) .................. PCT/EP2019/078381

(51) Int. Cl.
*G01S 19/40* (2010.01)
(52) U.S. Cl.
CPC .................................... *G01S 19/40* (2013.01)
(58) Field of Classification Search
CPC ..................................................... G01S 19/40
See application file for complete search history.

(56) References Cited

U.S. PATENT DOCUMENTS

| 6,577,952 B2 | 6/2003 | Geier et al. |
| 8,374,783 B2 | 2/2013 | Takac et al. |
| 8,577,607 B2 | 11/2013 | Williamson |
| 9,781,570 B2 | 10/2017 | Cho et al. |

(Continued)

FOREIGN PATENT DOCUMENTS

| DE | 102013014869 A1 | 3/2015 |
| EP | 1010988 B1 | 1/2007 |

(Continued)

OTHER PUBLICATIONS

International Search Report and Written Opinion for International Patent Application No. PCT/EP2019/078381, mailed Sep. 11, 2020, 18 pages.

(Continued)

*Primary Examiner* — Seth A Silverman
(74) *Attorney, Agent, or Firm* — Withrow & Terranova, PLLC (57) ABSTRACT

The present disclosure relates to an electronic arrangement (200), generally adapted to determine a movement. Specifically, the electronic arrangement is arranged to determine and handle an error drift related to signals received from plurality of satellites (210, 212, 214) arranged in communication with the electronic arrangement, and to determine a thereto related error corrected movement. The present disclosure also relates to a corresponding method and to a computer program product.

14 Claims, 7 Drawing Sheets

(56) References Cited

U.S. PATENT DOCUMENTS

| | | | | |
|---|---|---|---|---|
| 2009/0109090 A1* | 4/2009 | Vollath | ................... | G01S 19/07 |
| | | | | 342/357.44 |
| 2010/0026566 A1* | 2/2010 | Ueda | ..................... | G01S 19/42 |
| | | | | 342/357.36 |
| 2011/0012785 A1* | 1/2011 | Mattos | .................... | G01S 19/27 |
| | | | | 342/357.66 |
| 2012/0293366 A1* | 11/2012 | Liu | ........................ | G01S 19/24 |
| | | | | 342/357.26 |
| 2015/0138015 A1 | 5/2015 | Ishigami et al. | | |
| 2017/0307763 A1 | 10/2017 | Browning | | |

FOREIGN PATENT DOCUMENTS

| | | | |
|---|---|---|---|
| EP | 2816374 | A1 | 12/2014 |
| JP | H11118903 | A | 4/1999 |
| WO | 2008108194 | A2 | 9/2008 |
| WO | 2008108194 | A3 | 9/2008 |
| WO | 2010058266 | A2 | 5/2010 |
| WO | 2010073113 | A1 | 7/2010 |

OTHER PUBLICATIONS

International Search Report and Written Opinion for International Patent Application No. PCT/EP2020/078945, mailed Dec. 4, 2020, 15 pages.

International Preliminary Report on Patentability for International Patent Application No. PCT/EP2020/078945, mailed Feb. 1, 2022, 17 pages.

* cited by examiner

Fig. 6

ELECTRONIC ARRANGEMENT FOR DETERMINING A MOVEMENT

This application is a 35 USC 371 national phase filing of International Application No. PCT/EP2020/078945, filed Oct. 14, 2020, which claims the benefit of International Application No. PCT/EP2019/078381, filed Oct. 18, 2019, the disclosures of which are incorporated herein by reference in their entireties.

TECHNICAL FIELD

The present disclosure relates to an electronic arrangement, generally adapted to determine a movement. Specifically, the electronic arrangement is arranged to determine and handle an error drift related to signals received from a plurality of satellites arranged in communication with the electronic arrangement, and to determine a thereto related error corrected movement. The present disclosure also relates to a corresponding method and to a computer program product.

BACKGROUND

Currently, navigation systems for moving bodies such as vehicles are well known. Such navigation systems have shown great impact in the introduction of advances in the semi and fully autonomous operation of such vehicles, effectively providing driver assistance and safety functions, such as adaptive cruise control, etc.

An exemplary navigation system may for example comprises a GPS positioning device which is used to produce a positioning result based on information received from a plurality of satellites. To achieve the desired effect of such features, there is however a need to ensure that the navigation systems provides reliable measurements in regards to the position and movement of the vehicle. Relying solely on the satellite signals have however shown to be insufficient to achieve the desired positional reliability.

A solution trying to contravene this problem is disclosure in US20150138015, where the positioning result based on the satellite signals is combined with measurements from various sensors (such as a velocity sensor, an angular velocity sensor and an acceleration sensor) to identify a vehicle position on a road link of map data.

Even though the solution disclosed in US20150138015 presents an interesting approach to improving the reliability of the vehicle position, it still needs a plentiful of further data to reduce the inherent error of the GPS positioning device. Accordingly, there appear to be further room for improvement, specifically focusing on a solution where the need for additional, external, input is needed.

Further attention is drawn to WO2008108194, disclosing a mobile-unit positioning device which is capable of performing a weighted positioning computation which appropriately reflects a different error for every satellite.

Also WO2008108194 presents an interesting solution, also the solution WO2008108194 fails to ensure the reliability as for example needed in relation to vehicles, such as autonomous vehicles.

SUMMARY

According to an aspect of the present disclosure, the above is at least partly alleviated by an electronic arrangement adapted to determining a movement, the electronic arrangement comprising a control unit, wherein the control unit is adapted to receive an indication of an absolute geographical position for the electronic arrangement, receive signals from each of a plurality of satellites, wherein each of the signals comprise information indicative of a current time and position being specific for the related satellite, determine a first error drift for each of the plurality of satellites, wherein the first error drift is determined based on the electronic arrangement being standstill and two individual signals from the same satellite being received with a predetermined time therebetween and only when the electronic arrangement is indicative of being standstill, the first error drift defining a measured movement of the same satellite between the reception of the two individual signals, determine the movement of the electronic arrangement based on signals received over time from each of a plurality of satellites and the corresponding first error drift for each of the plurality of satellites, and determine an intermediate geographical position of the electronic arrangement based on the absolute geographical position and the determined movement of the electronic arrangement.

The overall idea with the present disclosure is to implement a scheme where not external input, as compared to e.g. the above presented prior-art solution, is needed to estimate an error correction that in turn may be used for determining a corrected movement of the electronic arrangement. Advantages following the present disclosure includes an overall improved reliability, since the error correction may be performed completely without any additional input from e.g. sensor arranged in communication with the control unit.

As defined above, the determination of the first error drift is only performed when the electronic arrangement is indicative of being standstill. Such an indication may be provided in different ways, for example manually or using some form of sensor means. Accordingly, in an embodiment of the present disclosure the control unit is arranged in communication with a first sensor adapted for collecting movement data, and the control unit is further adapted to receive the movement data from the first sensor and determine an indication of movement of electronic arrangement. The option to form the standstill indication may be completely dependent on the type of implementation at hand. As such, in some embodiments it may be more suitable to allow a user to provide the indication, whereas it may be highly desirable to allow the error drift and corrected movement to be determined in a completely automated manner. Advantageously, the first sensor generates data being independent of the signals from the satellite. The first sensor may also, optionally, be provided as a component of the electronic arrangement.

Furthermore, as defined above the presently discloses scheme allows for a corrected movement to be determined. In line with the present disclosure the scheme is however extended to allowing for a possibility to determine an intermediate geographical position of the electronic arrangement. This is achieved by adapting the control unit to also receive an indication of an absolute geographical position for the electronic arrangement and determine an intermediate geographical position of the electronic arrangement based on the absolute geographical position and the determined movement of the electronic arrangement. Accordingly, with an absolute geographical position at hand, it may be possible to make use of the corrected movement to (essentially) continuously determine a further geographical location, taking its start in the absolute geographical position and extending with the (known) corrected movement of the electronic arrangement.

Within the context of the present disclosure the expression "based on signals received over time" as introduced above should, typically, be understood to refer to signals from the different satellites received after the error drift has been determined. As such, in some embodiments the error drift is determined using a first plurality of signals from the satellites, followed by a determination of the movement involving a second plurality of signals, where the second plurality of signals are received subsequent of the first plurality of signals. In some embodiments it may however be possible to allow some or all of the first and the second plurality of signals to overlap.

The absolute geographical position may in a similar manner as indicated above be provided in a manual manner to the electronic arrangement, such as by means of a user interface. However, the electronic arrangement may also automatically be provided with the absolute geographical position using e.g. wireless communication means. That is, when the electronic arrangement (e.g. in case of being mobile, as will be elaborated below) is a position in a close vicinity to a known absolute geographical position, e.g. a beacon arranged at the absolute geographical position may wirelessly transmit the absolute geographical position to the electronic arrangement.

In one embodiment the control unit is further adapted to determine a difference in distance for each of the satellites, and the error drift is further dependent on the determined distance.

Accordingly, for each of the signals received from each of the satellites it may be possible, in line with the present disclosure, to compare an expected distance change to the measured distance change as is made possible based on the information comprised with the signals from each of the satellites. This distance comparison may then, in turn, be used for determining the error drift. In some embodiments it may be possible to use a carrier-phase of the subsequently received signals for determine the difference in distance.

In some embodiments it may not be sufficient to rely on only a sole determination of the error drift. Rather, it may be advantageous to arrange the control unit to also determine a subsequent second error drift, the second error drift determined within a predetermined time period after the determination of the first error drift. The predetermined time period may in some embodiments be five minutes, preferably three minutes. Within the context of the present embodiment it may however be possible to allow the predetermined time period to vary, for example dependent on the implementation at hand.

In some embodiments of the present disclosure the electronic arrangement further comprises a receiver arranged in communication with the control unit, the receiver adapted to receive the signals from the plurality of satellites. The receiver is advantageously arranged in communication with an antenna adapted to receiving satellite signals. Furthermore, it is in some embodiment desirable to allow the receiver to form part of a global navigation satellite system.

In a preferred embodiment of the present disclosure, the electronic arrangement is provided as a component of a vehicle. The vehicle may in turn be e.g. one of a bus, a truck, a car, or any form of construction equipment or working machine. The vehicle may furthermore be at least one of a pure electrical vehicle (PEV) and a hybrid electric vehicle (HEV). The control unit may in such embodiments for example be an electronic control unit (ECU), e.g. provided as an onboard component of the vehicle.

In case the electronic arrangement is provided as vehicle component, it may for example be possible to make use of the determined corrected movement of the vehicle to control the operation of the vehicle. As an example, the vehicle may be adapted to continuously store parameters corresponding to a movement of the vehicle. The stored movement parameters, representing a previously performed movement of the vehicle may in one embodiment be corrected using the error drift determined by the electronic arrangement. That is, the above discussed predetermined time period where the error drift is considered as valid may not only be applied to a future movement of the vehicle. Rather, the error drift may also, or alternatively, be used for correcting parameters relating to a previous movement of the vehicle.

In one embodiment the correction of a previous movement of the vehicle may be used for reversing the vehicle along the same path as was previously taken when driving the vehicle. As an example, in case the vehicle is moving along a road/path that later e.g. appears to be an incorrect road/path, then the parameters relating to the previous movement may be corrected using the scheme according to the present disclosure, followed by controlling the vehicle according to the corrected parameters relating to the previous movement may be used for controlling the reversing action of the vehicle, whereby the vehicle with a high level of certainty may be ensured to be controlled essentially along exactly the same path as was previously taken when travelling in the forward direction.

It should however be understood that the electronic arrangement, as an alternative, may be provided as a component of a mobile electronic device. Such an electronic device may possibly be a wearable electronic device, a mobile phone, a tablet, etc.

Additionally, the electronic arrangement could also, as a further alterative, be provided as a component of a building, where the electronic arrangement may be arranged to measure a movement of an elevated position of the building in a vicinity of a top of a roof of the building. Such an implementation may for example be useful for use in relation to a situation where e.g. the building may be expected to move, such as in areas with high winds and/or earthquakes.

According to another aspect of the present disclosure there is provided a computer implemented method for determining a movement of an electronic arrangement, the electronic arrangement comprising a control unit, wherein the method comprises the steps of receiving, at the control unit, an indication of an absolute geographical position for the electronic arrangement, receiving, at the control unit, signals from each of a plurality of satellites, wherein each of the signals comprise information indicative of a current time and position being specific for the related satellite, determining, by the control unit and only when the electronic arrangement is indicative of being standstill, a first error drift for each of the plurality of satellites, wherein the first error drift is determined based on the electronic arrangement being standstill and two individual signals from the same satellite being received with a predetermined time therebetween, the first error drift defining a measured movement of the same satellite between the reception of the two individual signals, determining, by the control unit, the movement of the electronic arrangement based on signals received over time from each of a plurality of satellites and the corresponding first error drift for each of the plurality of satellites, and determining, by the control unit, an intermediate geographical position of the electronic arrangement based on the absolute geographical position and the determined movement of the electronic arrangement. This aspect of the present disclosure provides similar advantages as discussed above in relation to the previous aspect of the present disclosure.

According to a further aspect of the present disclosure there is provided a computer program product comprising a non-transitory computer readable medium having stored thereon computer program means for operating an electronic arrangement adapted to a determining a movement, the electronic arrangement comprising a control unit, wherein the computer program product comprises code for receiving, at the control unit, an indication of an absolute geographical position for the electronic arrangement, code for receiving, at the control unit, signals from each of a plurality of satellites, wherein each of the signals comprise information indicative of a current time and position being specific for the related satellite, code for determining, by the control unit and only when the electronic arrangement is indicative of being standstill, a first error drift for each of the plurality of satellites, wherein the first error drift is determined based on the electronic arrangement being standstill and two individual signals from the same satellite being received with a predetermined time therebetween, the first error drift defining a measured movement of the same satellite between the reception of the two individual signals, code for determining, by the control unit, the movement of the electronic arrangement based on signals received over time from each of a plurality of satellites and the corresponding first error drift for each of the plurality of satellites, and code for determining, by the control unit, an intermediate geographical position of the electronic arrangement based on the absolute geographical position and the determined movement of the electronic arrangement. Also this aspect of the present disclosure provides similar advantages as discussed above in relation to the previous aspects of the present disclosure.

The computer readable medium may be any type of memory device, including one of a removable nonvolatile random-access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1A:
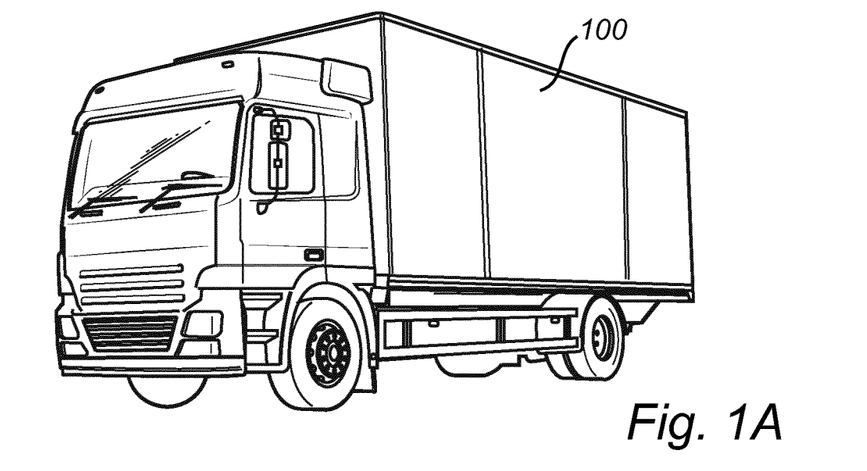
FIG. 1A illustrates a truck, 1B a bus and 1C a wheel loader in which the control system according to the present disclosure may be incorporated.
Figure 1B:
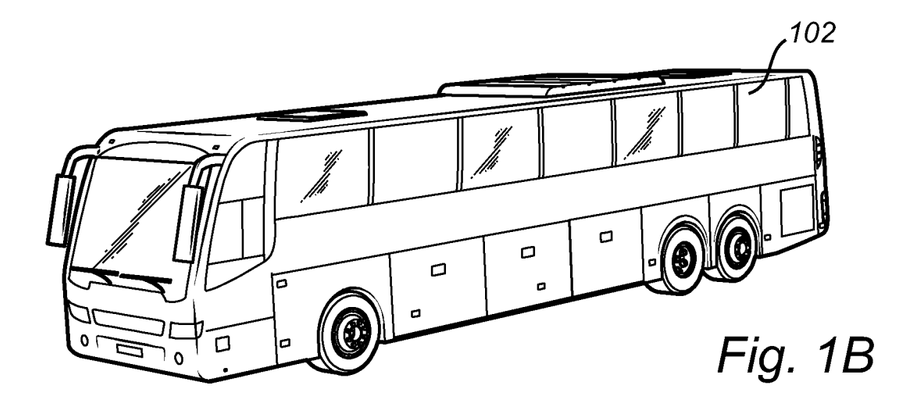
Figure 1C:
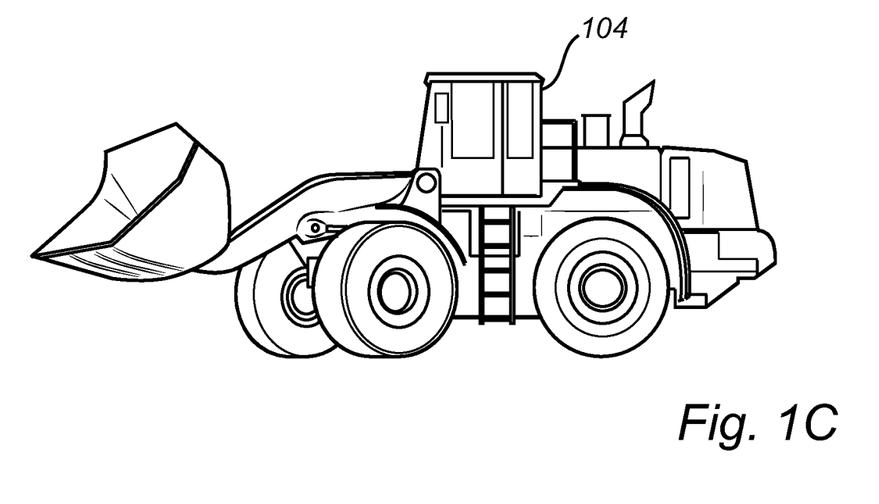
Figure 2:
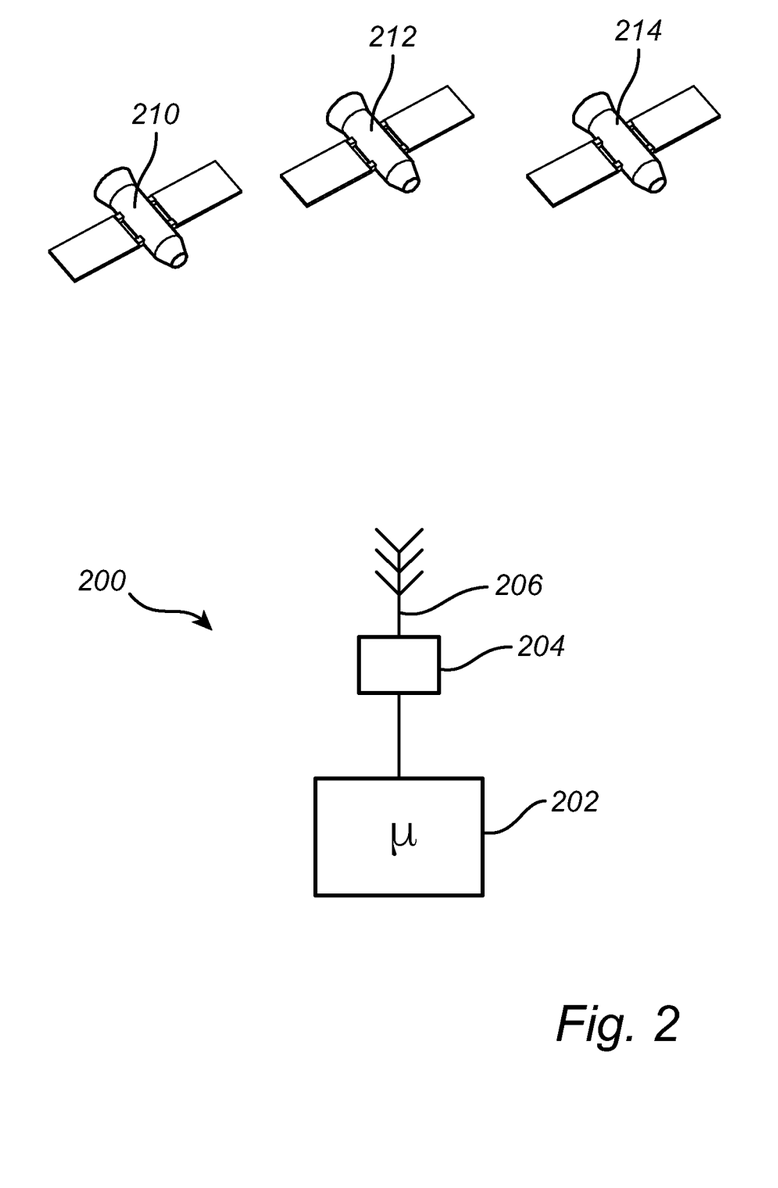
FIG. 2 illustrates a conceptual electronic arrangement in accordance to a currently preferred embodiment of the present disclosure.

Referring now to the drawings and to FIG. 1A in particular, there is depicted an exemplary vehicle, here illustrated as a truck 100, in which a control system 200 (as shown in FIG. 2) according to the present disclosure may be incorporated. The control system 200 may of course be implemented, possibly in a slightly different way, in a bus 102 as shown in FIG. 1B, wheel loader as shown in FIG. 1C, a car, a bus, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated, fully or semi-autonomous.

FIG. 2 shows a conceptual and exemplary implementation of the electronic arrangement 200, comprising a control unit 202, such as an electronic control unit (ECU), a receiver 204 and an antenna 206. The ECU 202 is connected to the receiver 204 and the receiver 204 is in turn connected to the antenna 206. During operation of the electronic arrangement 200 in line with the presently disclosed scheme, the antenna 206 receives signals from a plurality of different satellites 210, 212, 214 (typically up to 12 satellites). It should be noted that the satellites 210, 212, 214 do not form part of the electronic arrangement 200.

For reference, the ECU 202 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The receiver 204 and the antenna 206 may in some embodiments form part of e.g. a GPS receiver, where the GPS receiver may be adapted to forward "raw data" from the satellites to allow the ECU 202 to perform the scheme according to the present disclosure, i.e. without performing full processing before forwarding the data to the ECU 202.

Figure 3:
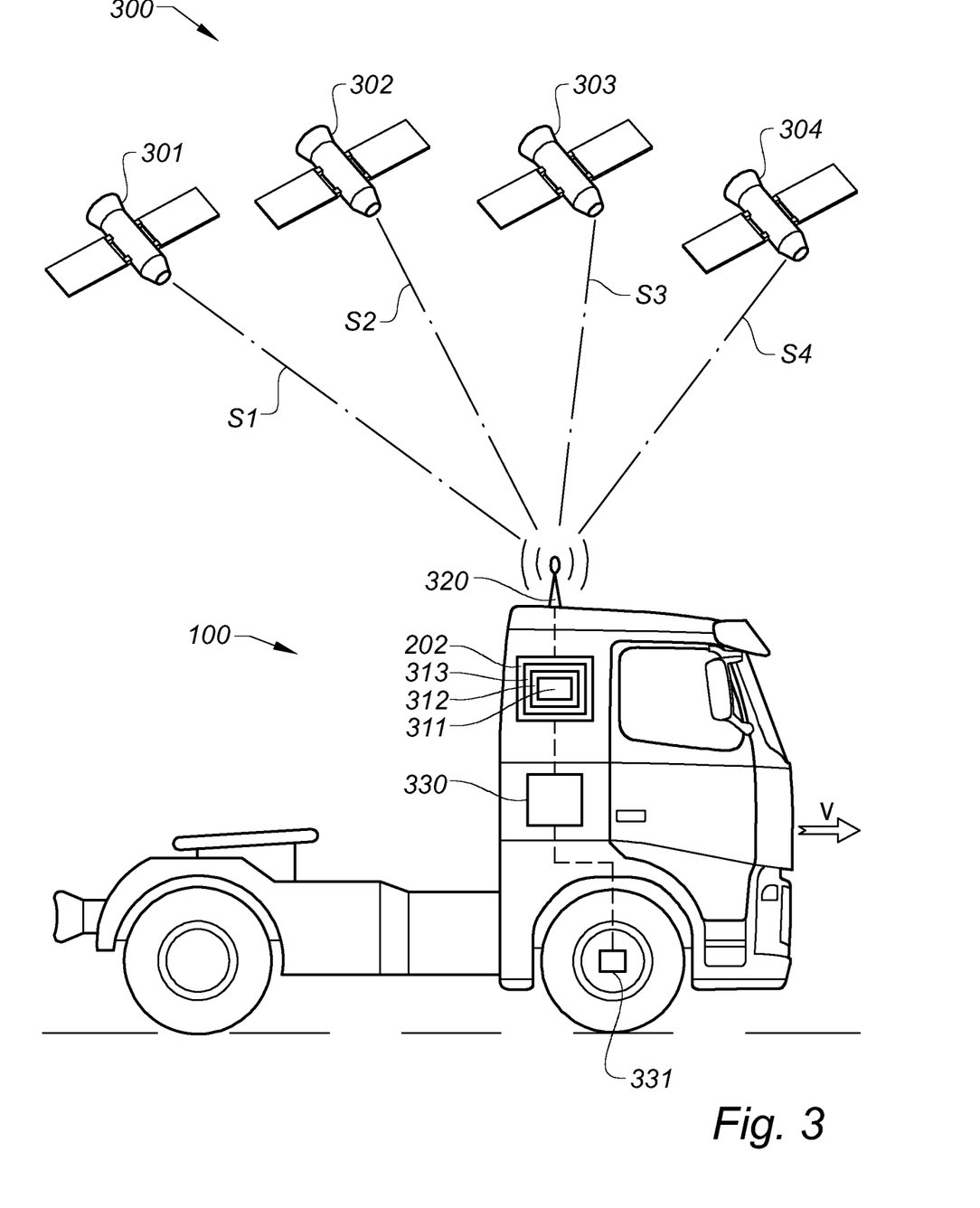
FIG. 3 exemplifies a first implementation of where the electronic arrangement of FIG. 2 may be included as a component.

FIG. 3A presents a first implementation of the electronic arrangement 200, here in relation to the truck 100. The truck 100 is here shown to have a movement speed v and interacting with a global navigation satellite system 300 in order to estimate the movement of the vehicle. The vehicle 100 comprises the ECU 202, an antenna 312 for communicating with the global navigation satellite system 300 and a movement speed estimation unit 330. The ECU 202 is connected to the antenna 320 and the movement speed estimation unit 330. Preferably, the antenna 320 is installed at the roof of the vehicle 100 and the movement speed estimation unit 330 comprises a movement speed sensor 331, which is arranged for estimating the angular velocity of at least one wheel of the vehicle 100.

Further, the global navigation satellite system 300 comprises a plurality of satellites 301, 302, 303, 303 interacting with the antenna 320 of the vehicle 100. The signals $S_1$, $S_2$, $S_3$, $S_4$ measured from satellites 301, 302, 303, 303 are influenced by a number of error sources. The errors will have different impact on different types of calculations. In the case of movement estimation many of the error sources will not affect the result, e.g. effects of receiver clock error are cancelled during the calculations. However, some of the remaining error sources can have a large impact on the result.

Since the scheme according to the present disclosure is interested in the movement of the vehicle 100, only the measurement from the satellite changes will be considered for the purpose of the below discussion. Thus, the proposed scheme is in one embodiment of the present disclosure not interested in the absolute distance measurement and therefore, an offset error in the measurement data does not influent the estimation result.

Figure 4A:
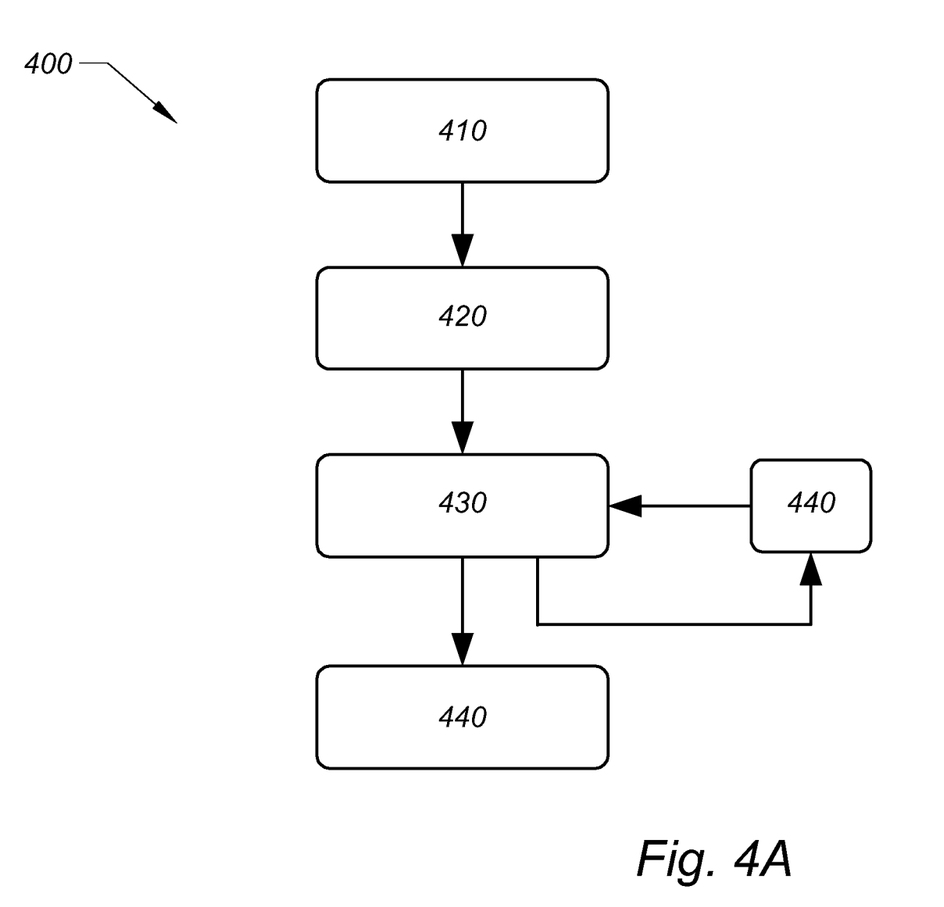
FIGS. 4A and 4B illustrates the different embodiment for implementing the processing steps for performing the method according to the present disclosure.
Figure 4B:
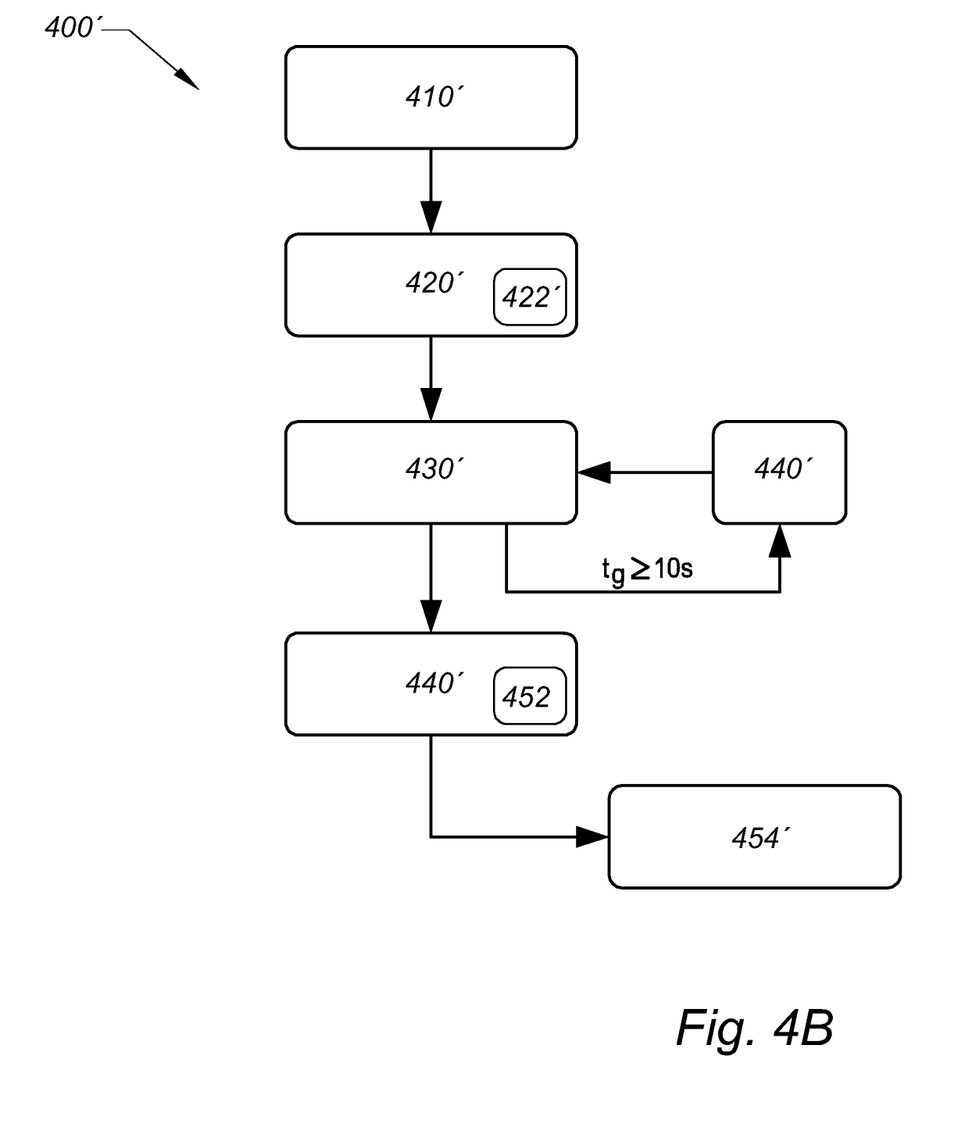

One way of estimating nearly error-free observables is proposed in FIG. 4A and/or FIG. 4B. FIG. 4A shows an embodiment of a method 400 for estimating the movement of a vehicle, preferably the truck 100 as is exemplified in FIG. 1. The method 400 comprises the steps of detecting the movement speed of the vehicle 410, detecting that the vehicle is stationary 420, estimating at least one correction factor 430, repeating the estimating for several times 440 and applying a new observable 450.

In a first step 410, the movement speed of the vehicle is detected, e.g. by a movement speed sensor of the vehicle. In a second step 420, it is detected that the vehicle is stationary, e.g. by a comparison of the actual movement speed of the vehicle with 0. If this comparison is true, the actual speed of the vehicle must be 0 and therefore, the vehicle is stationary.

In a third step 430, an error drift is estimated for each satellite (only while the vehicle is stationary), in particular by using an estimated satellite position, at least one carrier-phase observable and the detected movement speed of the vehicle (being 0 when the truck 100 is stationary/standstill). The error drift may in one embodiment be expressed as the quotient, wherein a difference between a measured distance change and the calculated distance change is the dividend and the sample time is the divisor.

This may be expressed as: Error drift=(measured distance change−calculated distance change)/sample time (estimated for each of the satellites).

The measured distance represents the distance the specific satellite has travelled between two samples. The measured distance is determined based on the mentioned carrier-phase observable at each sample. For example, two subsequently sampled carrier-phase observables may be used for determining the measured distance change, e.g. as carrier-phase @ t1—carrier phase @ t0.

It should be understood that each carrier-phase observable represents a distance between the vehicle and the specific satellite. As an example:

Measured distance change=(distance between vehicle and specific satellite @$t$1)−(distance between vehicle and specific satellite @$t$0).

The carrier-phase observable relates to the travelling time for a signal to propagate from a phase centre of a satellite antenna (at an emission time) to the phase centre of a receiver (at a reception time)(e.g. where the receiver is arranged at the vehicle).

The calculated distance on the other hand represents the distance the vehicle has travelled between two samples. Since the vehicle is stationary, the calculated distance will be 0.

The step of estimating the correction factor 430 is repeated for several times n, e.g. 50 times, in order to obtain n correction factors. In one embodiment the 50 samples are collected over 10 seconds. This is illustrated by box 440. In a last step 450, a new observable is applied based on an average of the n estimated correction factors. The new observable may then be used to estimate the movement of the vehicle. A such, the above-mentioned time between two samples will for 50 times (samples) and 10 seconds be: 10 seconds divided by 50=0.2 seconds.

FIG. 4B shows a preferred embodiment of a method 400' for estimating the movement of a vehicle, in particular a preferred embodiment of a method as shown in FIG. 4A. The method 100' comprises the steps of: detecting the movement speed of the vehicle 410', detecting that the vehicle is stationary 420', estimating at least one correction factor 430', repeating the estimating for a number of times 440' and applying a new observable 450'.

In a first step 410', the movement speed of the vehicle is detected, e.g. by a movement speed sensor of the vehicle. In a second step 420', it is detected that the vehicle is stationary, e.g. by a comparison of the actual movement speed of the vehicle with 0. If this comparison is true, the actual speed of the vehicle must be 0 and therefore, the vehicle is stationary.

The second step 420' also comprises the step of comparing 422' a value indicating the movement speed of the vehicle with a constant value, wherein the constant value is 0. For example, the detected movement speed has value k, which is compared with the value 0. If value k is also 0, the vehicle is determined as being stationary, in particular as long as value k is 0. If value k is not 0, the vehicle is determined as not being stationary.

In a third step 430', an error drift is estimated for each satellite while the vehicle is stationary, in particular by using an estimated satellite position, at least one carrier-phase observable and the detected movement speed of the vehicle, which is 0 (the truck 100 being stationary/standstill). The error drift may be expressed as the quotient, wherein a difference between a measured distance change and the calculated distance change is the dividend and the sample time is the divisor.

The step of estimating the correction factor 430' is repeated for a number of times, e.g. 50 times, in order to obtain n correction factors. This is illustrated by box 140. Furthermore, the sample time is less than 10 seconds.

In a last step 450', a new observable is applied based on an average of the n estimated correction factors. The step 450' also comprises the step of applying 452', wherein a measured distance change is used, e.g. the measured distance change may expressed as a sum, wherein a difference between a carrier-phase at a second point in time and carrier-phase at a first point in time is the first summand and a product of correction factor and sample time is the second summand. The new observable may then be used to estimate the movement of the vehicle.

Moreover, the error drift may be applied to stored data, in particular wherein the stored data comprises stored samples of at least 5, preferably 10, meters of a movement of the vehicle or of the at least last 10 seconds of a movement of the vehicle. This step is illustrated by box 454'.

Moreover, and referring to the step 450', which may be called "application step", it is also possible to apply the correction of stored measurements in the near-past. For example, for a reverse support function as has been discussed above. When a reverse support function is initiated, e.g. manually or automatically by a) the vehicle has stopped at some point in the last couple of minutes which enabled the estimation of the correction factors. Thus, they do not need to be recalibrated. The reversing manoeuvre can be initiated immediately. As an alternative b), the vehicle has not been stopped the last couple of minutes. Correction factors needs to be estimated.

When applying the correction factors to stored data it can be done either by processing all the store data at once. Another option is to keep a window of processed data available as the truck reverses. For example, when the reverse support function is initiated the correction factors are applied to the first 10 meters of stored samples. When the trucks start reversing additional samples will be processed to maintain 10 meters of processed trajectory.

Thus, above described vehicle, in particular above described movement estimation device, also comprises a reverse support function, as described above. In a preferred embodiment, the method described above does not use an odometry using vehicle sensor data (wheel ticks, vehicle speed, yaw rate, etc.), SLAM-like algorithms using laser scanner data or RTK-based GNSS solution (which requires external correction data).

As was indicated above, the electronic arrangement 200 is not limited for use in relation to only a vehicle, such as the truck 100. Rather, other applications are possible, such as in relation to a mobile device, such as a wearable electronic device having suitable processing capabilities, a mobile phone, a tablet, etc. The presently disclosed scheme for correcting a movement of the electronic arrangement 200 may thus be used in correcting also the movement of the mobile device. Accordingly, the electronic arrangement 200 according to the present disclosure may be used in relation to any other form of mobile implementation where it is suitable to improve accuracy of movement.

Figure 5:
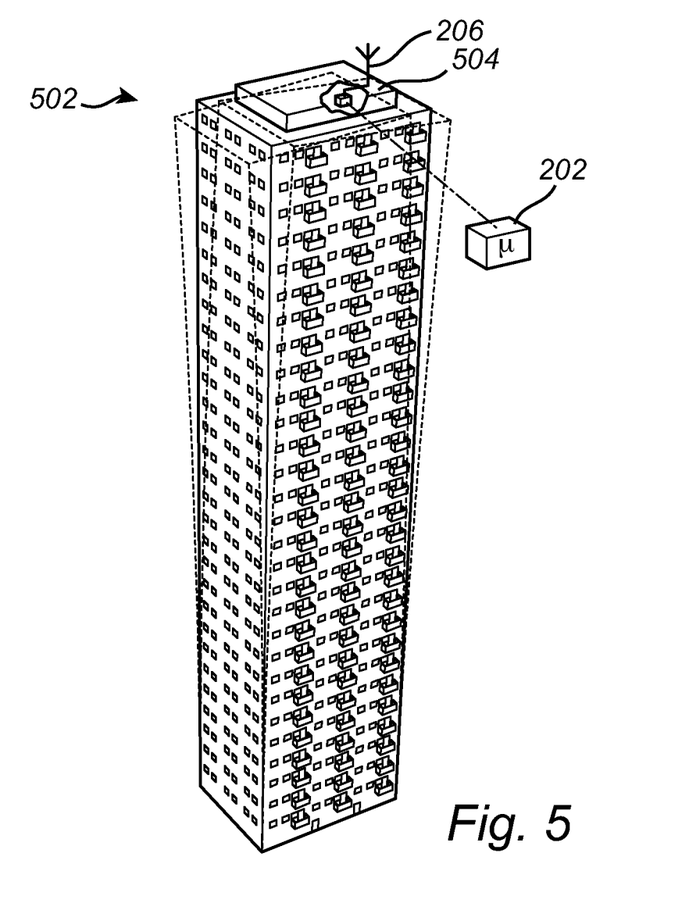
FIG. 5 shows an alternative second implementation comprising the electronic arrangement as shown in FIG. 2.

One such implementation is in regards to a high building 502 as exemplified in FIG. 5, where the building 502 may move due to extreme environmental forces such as seismic events or wind sway caused by hurricane winds. In the illustration presented in FIG. 5 the electronic arrangement 200 is shown to be provided as a component of the building 502. To be specifically noted, the antenna 206 is shown to be provided at a vicinity or on top of a roof 504 of the building 502.

In line with the above discussion, the error drift may be determiner regularly (such as for example once every three to five minutes). Subsequently, in case of the building starting to move, also the antenna 206 atop the building 502 will start to move in a corresponding manner. The signals received at the antenna 206 from the e.g. the satellites 210, 212, 214 will thus be used to determine the movement. Using the scheme according to the present disclosure it may as such be possible to determine a corrected movement of the building 502.

Figure 6:
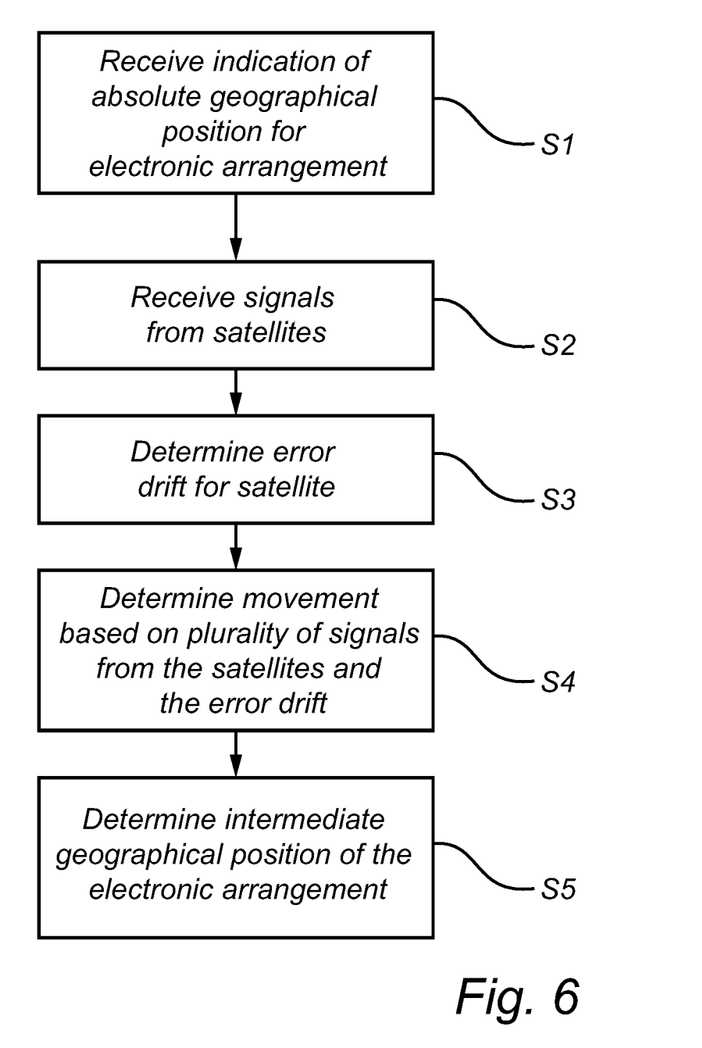
FIG. 6 illustrates a flow chard for a general implementation of the performing the method according to an embodiment of the present disclosure.

In summary with further reference to FIG. 6, the present disclosure relates to a computer implemented method for determining a movement of an electronic arrangement 200, the electronic arrangement 200 comprising a control unit 202, wherein the method comprises the steps of receiving, S1 at the control unit, an indication of an absolute geographical position for the electronic arrangement, receiving, S2 at the control unit 202, signals, $S_1$, $S_2$, $S_3$, from each of a plurality of satellites 210, 212, 214, wherein each of the signals comprise information indicative of a current time and position being specific for the related satellite, 210, 212, 214. The method further comprises determining, S3, by the control unit and only when the electronic arrangement 200 is indicative of being standstill, a first error drift for each of the plurality of satellites 210, 212, 214, wherein the first error drift is determined based on the electronic arrangement 200 being standstill and two individual signals from the same satellite being received with a predetermined time therebetween, the first error drift defining a measured movement of the same satellite between the reception of the two individual signals, determining, S4 by the control unit, 202, the movement of the electronic arrangement 200 based on signals received over time from each of a plurality of satellites 210, 212, 214 and the corresponding first error drift for each of the plurality of satellites 210, 212, 214, and determining, S5 by the control unit, an intermediate geographical position of the electronic arrangement based on the absolute geographical position and the determined movement of the electronic arrangement.

By means of the present disclosure it is made possible to implement a scheme where not external input, as compared to e.g. the above presented prior-art solution, is needed to estimate an error correction that in turn may be used for determining a corrected movement of the electronic arrangement. Advantages following the present disclosure includes an overall improved reliability, since the error correction may be performed completely without any additional input from e.g. sensor arranged in communication with the control unit.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A vehicle comprising an electronic arrangement adapted to determine a movement of the vehicle along a path, the electronic arrangement comprising a control unit and a first sensor for collecting movement data, wherein the control unit is adapted to:
   receive an indication of an absolute geographical position for the vehicle located at a first position along the path,
   receive signals from each of a plurality of satellites, wherein each of the signals comprise information indicative of a current time and position being specific for the related satellite,
   determine a first error drift for each of the plurality of satellites, wherein the first error drift is determined based on the vehicle being standstill and two individual signals from the same satellite being received with a predetermined time therebetween and only when the vehicle is indicative of being standstill, the first error drift defining a measured movement of the same satellite between the reception of the two individual signals,
   receive an indication of movement of the vehicle to a second position along the path based on movement data received from the first sensor,
   determine movement of the vehicle from the first position along the path to the second position along the path based on signals received over time from each of the plurality of satellites and the corresponding first error drift for each of the plurality of satellites, and
   determine an intermediate geographical position of the vehicle located at the second position along the path, wherein the intermediate geographical position of the vehicle is determined based on the absolute geographical position and the determined movement of the vehicle.

2. The vehicle of claim 1, wherein the control unit is further adapted to determine a difference in distance for each of the satellites, and the error drift is further dependent on the determined distance.

3. The vehicle of claim 1, wherein the control unit is further adapted to determine a subsequent second error drift, the second error drift determined within a predetermined time period after the determination of the first error drift.

4. The vehicle of claim 3, wherein the predetermined time period is five minutes, preferably three minutes.

5. The vehicle of claim 1, further comprising a receiver arranged in communication with the control unit, the receiver adapted to receive the signals from the plurality of satellites.

6. The vehicle of claim 5, wherein the receiver is a component of a global navigation satellite system.

7. The vehicle of claim 1, wherein the first sensor generates data being independent of the signals from the satellite.

8. The vehicle of claim 1, wherein the first sensor is arranged onboard the vehicle.

9. The vehicle of claim 1, wherein the vehicle is a truck, a car, a bus, or a working machine.

10. The vehicle of claim 1, wherein the control unit is arranged in communication with a first sensor adapted for collecting movement data, and the control unit is further adapted to:
    receive the movement data from the first sensor, and
    determine, at the control unit, an indication of movement of the electronic arrangement.

11. A computer implemented method for determining a movement of a vehicle along a path, the vehicle comprising an electronic arrangement, the electronic arrangement comprising a control unit and a first sensor for collecting movement data, wherein the method comprises the steps of:
    receiving, at the control unit, an indication of an absolute geographical position for the vehicle located at a first position along the path,
    receiving, at the control unit, signals from each of a plurality of satellites, wherein each of the signals comprise information indicative of a current time and position being specific for the related satellite,
    determining, by the control unit and only when the vehicle is indicative of being standstill, a first error drift for each of the plurality of satellites, wherein the first error drift is determined based on the vehicle being standstill and two individual signals from the same satellite being received with a predetermined time therebetween, the first error drift defining a measured movement of the same satellite between the reception of the two individual signals,
    receiving an indication of movement of the vehicle to a second position along the path based on movement data received from the first sensor,
    determining, by the control unit, the movement of the vehicle from the first position along the path to the second position along the path based on signals received over time from each of a plurality of satellites and the corresponding first error drift for each of the plurality of satellites, and
    determining, by the control unit, an intermediate geographical position of the vehicle when the vehicle is at the second position along the path, wherein the intermediate geographical position of the vehicle is determined based on the absolute geographical position and the determined movement of the vehicle.

12. The method of claim 11, further comprising the step of:

determining, by the control unit, a subsequent second error drift, wherein the second error drift is determined within a predetermined time period after the determination of the first error drift.

13. The method of claim 12, wherein the predetermined time period is five minutes, preferably three minutes.

14. A computer program product comprising a non-transitory computer readable medium having stored thereon computer program means for operating an electronic arrangement comprised with a vehicle and adapted to a determine a movement of the vehicle along a path, the electronic arrangement comprising a control unit, wherein the computer program product comprises: code for receiving, at the control unit, an indication of an absolute geographical position for the vehicle located at a first position along the path, code for receiving, at the control unit, signals from each of a plurality of satellites, wherein each of the signals comprise information indicative of a current time and position being specific for the related satellite, code for determining, by the control unit and only when the vehicle is indicative of being standstill, a first error drift for each of the plurality of satellites, wherein the first error drift is determined based on the vehicle being standstill and two individual signals from the same satellite being received with a predetermined time therebetween, the first error drift defining a measured movement of the same satellite between the reception of the two individual signals, code for receiving, by the control unit, an indication of movement of the vehicle to a second position along the path based on movement data received from the first sensor, code for determining, by the control unit, the movement of the vehicle from the first position along the path to the second position along the path based on signals received over time from each of a plurality of satellites and the corresponding first error drift for each of the plurality of satellites, and code for determining, by the control unit, an intermediate geographical position of the vehicle at the second position along the path, wherein the intermediate geographical position of the vehicle is determined based on the absolute geographical position and the determined movement of the vehicle.

* * * * *